(12) United States Patent
Lu et al.

(10) Patent No.: US 8,963,944 B2
(45) Date of Patent: Feb. 24, 2015

(54) METHOD, APPARATUS AND SYSTEM TO PROVIDE VIDEO DATA FOR BUFFERING

(75) Inventors: Manuel Lu, Union City, CA (US); Sunny Ng, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 395 days.

(21) Appl. No.: 13/472,423

(22) Filed: May 15, 2012

(65) Prior Publication Data

US 2013/0308057 A1 Nov. 21, 2013

(51) Int. Cl.
*H04N 7/12* (2006.01)
*G06F 3/038* (2013.01)
*G09G 3/20* (2006.01)

(52) U.S. Cl.
CPC .......................................... *G09G 3/20* (2013.01)
USPC ............................ 345/589; 375/240; 345/204

(58) Field of Classification Search
None
See application file for complete search history.

(56) References Cited

U.S. PATENT DOCUMENTS

| | | | | |
|---|---|---|---|---|
| 5,438,423 | A * | 8/1995 | Lynch et al. | 386/295 |
| 6,788,882 | B1 * | 9/2004 | Geer et al. | 386/243 |
| 2004/0190058 | A1 * | 9/2004 | Iida | 358/1.15 |
| 2005/0123058 | A1 * | 6/2005 | Greenbaum et al. | 375/240.28 |
| 2009/0027360 | A1 | 1/2009 | Kwan et al. | |
| 2010/0278271 | A1 * | 11/2010 | MacInnis | 375/240.18 |
| 2012/0320993 | A1 * | 12/2012 | Gannholm | 375/240.27 |
| 2013/0286285 | A1 | 10/2013 | Lu et al. | |

* cited by examiner

*Primary Examiner* — Ulka Chauhan
*Assistant Examiner* — Sultana M Zalalee
(74) *Attorney, Agent, or Firm* — Blakely Sokoloff Taylor & Zafman LLP

(57) ABSTRACT

Techniques and mechanisms for circuitry to provide video data for loading to a buffer. In an embodiment, a loader circuit receives video data and determines MX data for a video frame and NZ data for the video frame, wherein M and N are different respective dimensions of a color space, and wherein X is a first encoding type and Z is a second encoding type. The first MX data includes data representing a first portion of a color component value, and the first NZ data includes data representing a second portion of that color component value. In another embodiment, the loader circuit sends the MX data via a first channel while sending the NZ data via a second channel to a random access buffer.

20 Claims, 9 Drawing Sheets

FIG. 6

METHOD, APPARATUS AND SYSTEM TO PROVIDE VIDEO DATA FOR BUFFERING

BACKGROUND

1. Technical Field

This disclosure relates generally to video data exchanges, and in particular, but not exclusively to exchanging video data for a liquid-crystal-on-silicon ("LCOS") projector.

2. Background Art

Improvements in video hardware technology continue to provide for an increasingly wide variety of electronic device which can implement, or otherwise support, the display of increasingly high resolution video images. For example, successive generations of computer hardware, such as that in handheld devices or other such platforms, are of increasingly small form factor, and are capable of supporting increasingly high throughput exchanges of video data.

However, as a result, it is increasingly important for such platforms to support exchanges between varied combinations of inter-device hardware or intra-device hardware. This is typically manifest as a need for video data to be exchanged in a particular format, order etc. which accommodates functionality of some downstream display hardware. Implementing functionality to address this need is constrained by the premium placed on size, weight, speed, cost, etc. in producing next-generation video devices. Accordingly, it is increasingly valuable to provide incremental improvements in efficiency for hardware to implement such functionality.

BRIEF DESCRIPTION OF THE DRAWINGS

The various embodiments of the present invention are illustrated by way of example, and not by way of limitation, in the figures of the accompanying drawings and in which:

FIG. 6 is a table illustrating encoding for video data to be buffered according to an embodiment.

DETAILED DESCRIPTION

Embodiments discussed herein variously include techniques or mechanisms for providing video data which is to be loaded into a buffer. One or more characteristics associated with such video data—e.g. associated with the communication thereof—may facilitate operation of display conditioning logic. For example, a loader circuit may load first encoded data for a video frame into a buffer prior to outputting second encoded data for the video frame. In an embodiment, display conditioning logic receives the second encoded data independent of the buffer, and further receives the first encoded data via the buffer.

The first encoded data and the second encoded data may include different respective types of encoding. Alternatively or in addition, the first encoded data and the second encoded data may correspond to different respective dimensions of a color space such as a Red-Green-Blue (RGB) color space. By way of illustration and not limitation, the first encoded data may include first-encoding-type data representing a first portion of a color component value, and the second encoded data may include second-encoding-type data representing a second portion of the same color component value.

Display conditioning logic may use both the first encoded data and the second encoded data to provide signaling for use in displaying a color component corresponding to the color component value. The comparatively early output of the first encoded data for buffering allows reduces the delay in operations of display conditioning logic which are subsequent to output of the second encoded data.

Figure 1:
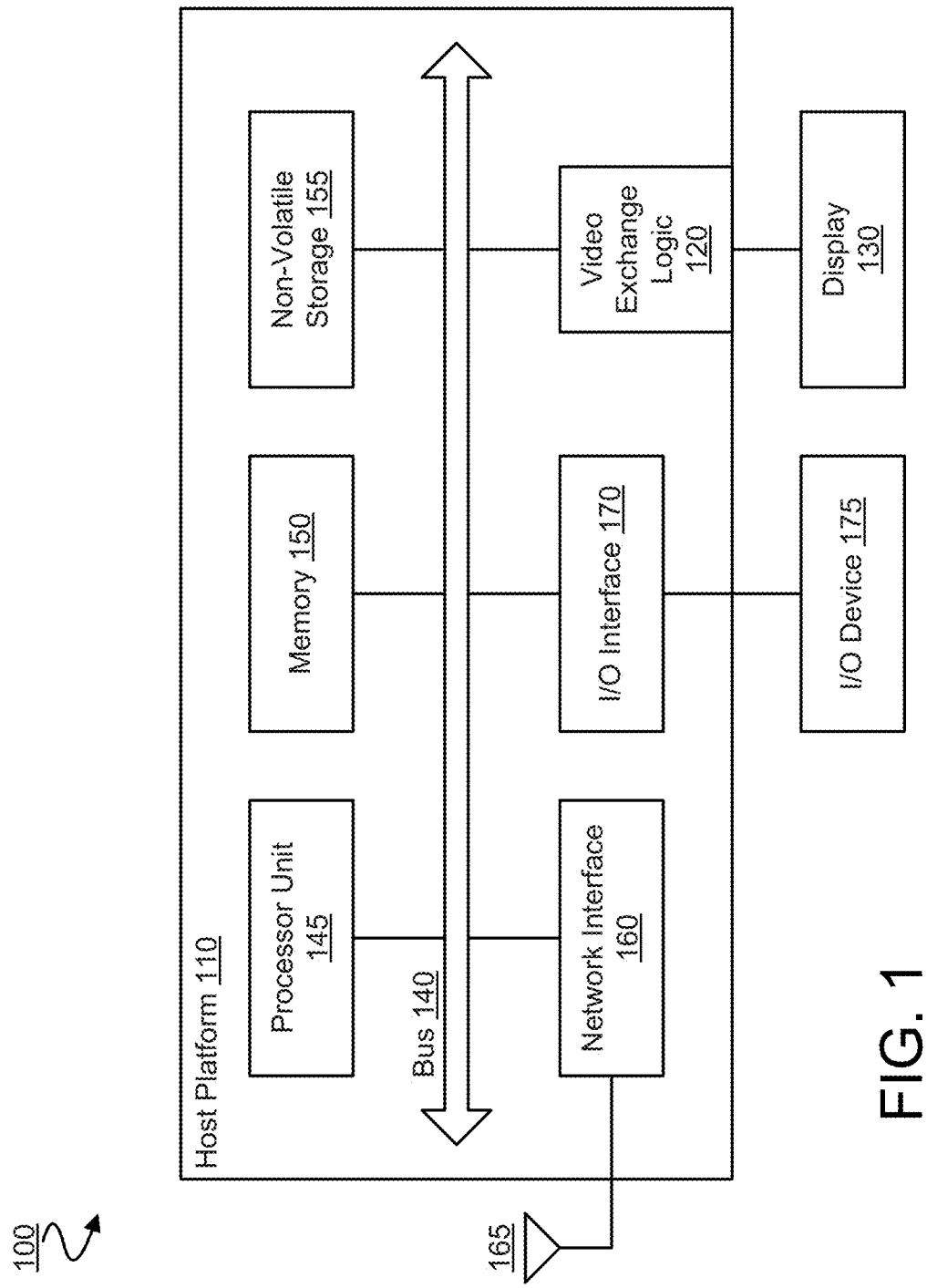
FIG. 1 is a block diagram illustrating elements of a computer system for exchanging video data according to an embodiment.

FIG. 1 illustrates elements of computer system 100 including any of a variety of combinations of logic—e.g. hardware, software and/or executing software logic—to exchange video data according to an embodiment. Computer system 100 may include host platform 110 and display 130, where video communications are to take place between host platform 110 and display 130 via video exchange logic 120. Host platform 110 may include any of a variety of platforms including, but not limited to, that of a desktop computer, laptop computer, server, handheld device (e.g. smart phone, PC tablet, palmtop, etc.), video gaming consol, digital video recorder, compact disc player, digital video disc player, set-top box or the like.

Display 130 may include a personal computer (PC) monitor, television, projector or other such hardware for receiving video data and presenting a video image to a user based on such video data. Display 130 may provide light-emitting diode (LED), organic LED (OLED), plasma, liquid-crystal-on-silicon (LCOS), laser and/or other such mechanisms for presenting a video image. Although shown as coupled to (distinct from) host platform 110, display 130 may, in an alternate embodiment, be integrated into host platform 110.

Video exchange logic 120 may provide one or more hardware mechanisms to receive video data and process such video data in preparation for providing the resulting processed video data for use by display 130. Such processing may, for example, include video exchange logic 120 variously performing any of a variety of combinations of evaluating, encoding/decoding, distributing, serializing, synchronizing and/or other operations such as those discussed herein. Such processing may, in an embodiment, be in addition to other video data processing performed by other logic of host platform 110 and/or by other logic of display 130.

FIG. 1 shows an illustrative architecture of host platform 110 for providing video data to be operated on by video exchange logic 120. The architecture of host platform 110 may include any of a variety of additional or alternative features, according to different embodiments. For example, certain embodiments are not limited with respect to the particular components of host platform 110 for operating with video exchange logic 120 and/or with respect to the respective configuration of such components relative to one another.

In one embodiment, host platform 110 includes one or more buses—e.g. including bus 140—and components variously coupled thereto. By way of illustration and not limitation, host platform 110 may include one or more of processor unit 145, memory 150, non-volatile storage 155, network interface 160, and I/O interface 170, some or all of which are variously coupled to one another, for example, via bus 140. Although shown as residing within host platform 110, some or all of video exchange logic 120 may be alternatively located, according to different embodiments, in display 130 and/or in some dedicated device distinct from, and coupled between, host platform 110 and display 130.

Processor unit 145 may include one or more processor cores to execute basic Input/Output System instructions, operating system instructions and/or other software code to facilitate preparations for an exchange of video data. Such code may, for example, be accessed by processor 145 from memory 150—e.g. where memory 150 includes some random access memory (RAM) such as dynamic RAM (DRAM), static RAM (SRAM) and/or the like. By way of illustration and not limitation, processor unit 145 may execute code for providing video content to video exchange logic 120 directly or indirectly from non-volatile storage 155—e.g. where non-volatile storage 155 includes a magnetic hard disk, solid state drive, optical disk, and/or other such form of data storage.

Alternatively or in addition, processor unit 145 may execute code which causes host platform 110 to receive such video content via network interface 160. In an embodiment, network interface 160—e.g. including an analog modem, Integrated Services Digital Network (ISDN) modem, wireless modem, network interface card (NIC) and/or the like—is to receive video content from any of a variety of combinations of one or more networks (not shown) including, but not limited to, a local area network (LAN), wide area network (WAN), virtual LAN (VLAN), cloud network, cellular network, Internet and/or the like. For example, network interface 160 may download content from a video streaming service via either one or both of a wired network and a wireless network—e.g. using one or more antenna 165 of host platform 110 coupled thereto.

In certain embodiments, host platform 110 includes one or more input/output (I/O) mechanisms for a user to receive and/or provide information. By way of illustration and not limitation, host platform 110 may include an I/O interface 170 for exchanging I/O data with some I/O device 175 including one or more of a mouse, touchpad, touchscreen, keyboard printer, scanner and/or other such I/O hardware. Operation of I/O device 175 may allow user access to operations of processor unit 145, information stored in memory 150 and/or non-volatile storage 155, or other such components of host platform 110. Although shown as coupled to (distinct from) host platform 110, I/O device 175 may, in an alternate embodiment, be integrated into host platform 110.

Figure 2:
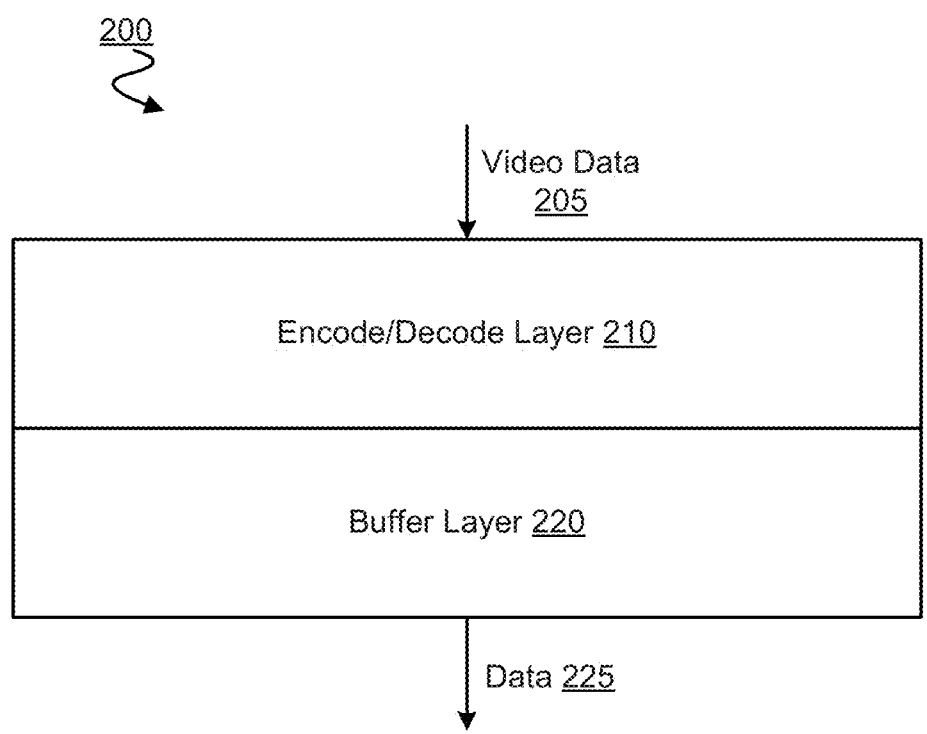
FIG. 2 is a block diagram illustrating elements of a functional stack for loading video data into a buffer according to an embodiment.

FIG. 2 illustrates elements of functional stack 200 for providing video data according to an embodiment. Functional stack 200 may be implemented in a system including some or all of the features of computer system 100, for example. By way of illustration and not limitation, some or all of functional stack 200 may be implemented by logic having one or more features of video exchange logic 200.

Video data 205 may be provided to functional stack 200—e.g. via a network streaming channel and/or some non-volatile storage of a platform including hardware of functional stack 200. In an embodiment, an encoding format (e.g. compressed), order, grouping, timing and/or other characteristic associated with video data 205 may not be compatible with operation of some logic, referred to herein as display conditioning logic (not shown), which is to put video data into condition for use by some display hardware.

By way of illustration and not limitation, display conditioning logic coupled to functional stack 200 may operate to provide, based on video data, a sequence of signals which in turn cause portions—e.g. a red portion, a green portion and a blue portion—of a given image to be variously strobed. Such logic may include pulse width modulation and/or other functionality to convert video data for operating LCOS, LED and/or other light emitting pixel circuitry. Additionally or alternatively, such logic may perform a comparison of information for a next video frame with information for a preceding video frame—e.g. the comparison to identify some repetitive or otherwise redundant portion of the next video frame. The variety and/or extent of operations by different display conditioning logic—and the respective data requirements imposed by such operations—may differ widely, and are not limiting on certain embodiments.

Functional stack 200 may include a sequence of operational stages (referred to herein as "layers") to receive video data 205—e.g. in series—and to operate on video data 205. In an embodiment, functional stack 200 is to buffer, encode/decode, reorder, synchronize and/or otherwise process video data 205 in order to provide some resulting data 225. As provided by functional stack 200, data 225 may include one or more characteristics which facilitate one or more later operations of display conditioning logic.

By way of illustration and not limitation, to facilitate data 225 having one or more characteristics suited for operations of display conditioning logic, functional stack 200 may include an encode/decode layer 210 comprising one or more encoders and/or decoders to operate on data which includes, or is otherwise based on, some or all of video data 205. In an embodiment, the received video data 205 describes one or more frames of video which each include a respective set of pixels. The color of a given pixel in a video frame may be represented by one or more color components which each correspond to a respective dimension of a color space. For example, one or more color components (also referred to herein simply as "components") which comprise a pixel cell's overall color may each correspond to a respective one of a red dimension, green dimension and blue dimension of a Red-Green-Blue (RGB) color space. Alternatively or in addition, one or more components of a pixel color may each correspond to a respective one of a luma dimension and one or more chrominance dimensions of a YUV color space. A pixel color may be similarly represented in terms of dimensions of any of a variety of additional or alternative color spaces—e.g. RGBW, RGBY and/or the like—according to different embodiments.

In an embodiment, video data 205 includes a data set (e.g. a block of data) describing some or all of a particular video frame. For example, such a data set may include information describing one or more respective color components for at least one or more pixels of the video frame. A data set may be specific to a subset of all pixels in a video frame, although certain embodiments are not limited in this regard. Alternatively or in addition, a data set may be specific to a particular dimension of a color space. By way of illustration and not limitation, color information in a data set may describe for some or all pixels of a video frame only pixel color components which are associated with a particular dimension of a color space. As used herein, "field" refers to a set of all color components for a pixel frame which are associated with a particular dimension of a color space—e.g. where a video frame may be comprised of a red field, a green field and a blue field.

Based on such received video data 205, encode/decode layer 210 may determine respective data for different ones of multiple video frames—e.g. including a first video frame and a second video frame. Determining a data set may include encode/decode layer 210 converting data from describing a video frame or portion thereof (e.g. a pixel, color component, field and/or the like) in terms of one color space to describing it in terms of some other color space. By way of illustration and not limitation, video data 205 may include values to identify a pixel color as a location in a first color space, such as a YUV color space. Determining a data set may include encode/decode layer 210 converting such values to instead identify a corresponding location in a second color space, such as a Red-Green-Blue (RGB) color space (or alternatively, one of a YUV color space, RGBW color space, RGBY color space, etc.).

Additionally or alternatively, determining a data set may include encode/decode layer 210 allocating various data for different respective processing—e.g. based upon whether (or not) such data is associated with a particular dimension of a color space. By way of illustration and not limitation, encode/decode layer 210 may identify that video frame information included in video data 205—or generated based on a color space conversion of video data 205—is specific to a particular dimension of a color space. Alternatively or in addition, encode/decode layer 210 may identify that such data is of a data type associated with a particular type of encoding. Based on such a determination, encode/decode layer 210 may determine whether or how such video frame information is to be further processed by other logic of functional stack 200.

By way of illustration and not limitation, functional stack 200 may include buffer layer 220 comprising any of a variety of combinations of one or more buffers to store data which is based upon video data 205. Encode/decode layer 210 may store to buffer layer 220 some or all of the data which encode/decode layer 210 has determined based on video data 205. Such data may later be debuffered from buffer layer 220 as some or all of data 225—e.g. where such data 225 has an encoding format (e.g. uncompressed), order, timing and/or other characteristic which facilitates one or more operations of display conditioning logic. In certain embodiments, at least some of data 225 includes data which has been determined by encode/decode layer 210 based on video data 205, but which has bypassed some or all buffering of buffer layer 220.

Figure 3:
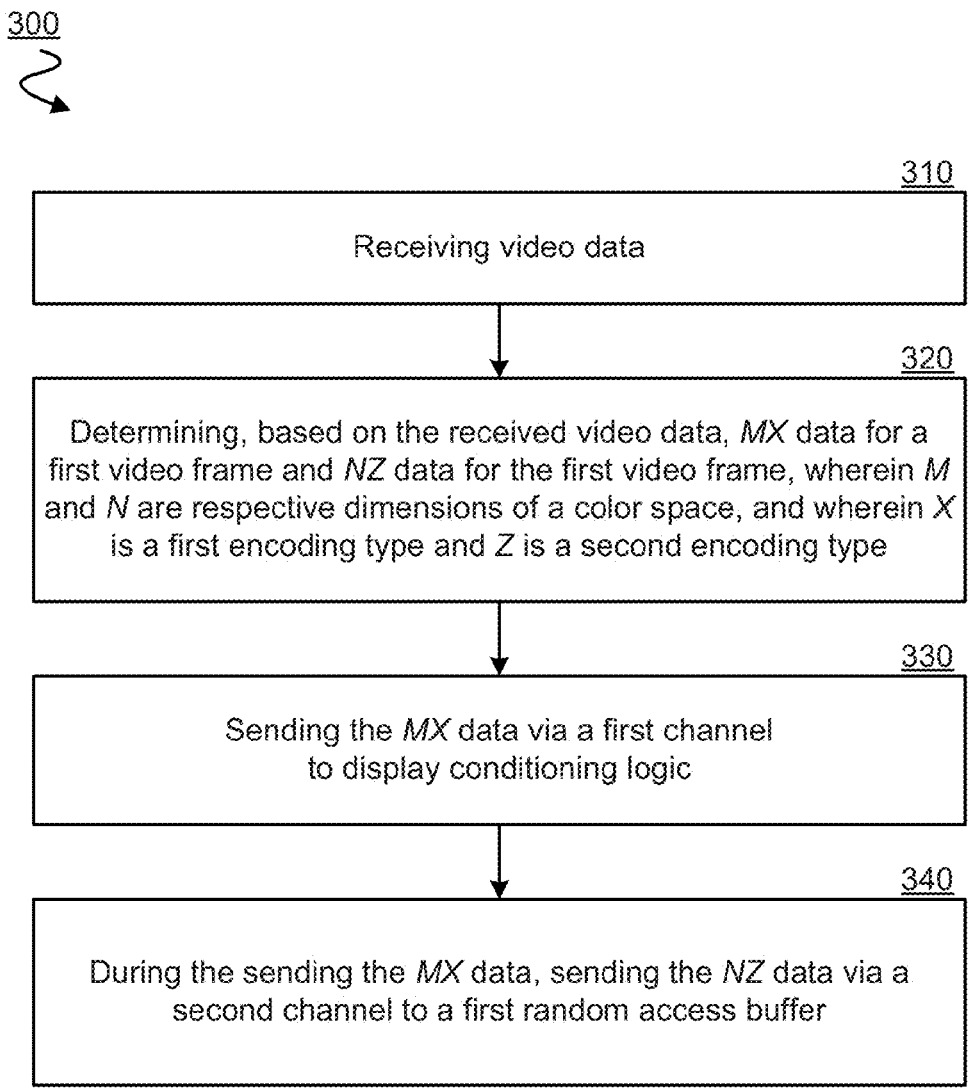
FIG. 3 is a flow diagram illustrating elements of a method for loading video data to a buffer according to an embodiment.

FIG. 3 illustrates elements of method 300 for providing video data according to an embodiment. Method 300 may be performed with circuit logic having one or more features of video exchange logic 120, for example. In an embodiment, method 300 is performed by hardware including some or all features of functional stack 200.

Method 300 may include, at 310, receiving video data describing, for example, one or more video frames. Such video data may include information describing respective color components for at least one or more pixels of a given video frame. The video data may be specific to a subset of all pixels in such a video frame, although certain embodiments are not limited in this regard.

Based on the video data received at 310, method 300 may determine, at 320, first data for a first video frame and second data for the same video frame. In an embodiment, the first data determined at 320 corresponds to one dimension of a color space, and the second data corresponds to another dimension of that same color space. Additionally or alternatively, the first data may be of a first encoding type, and the second data of a second encoding type.

For brevity in discussing features of certain elements, M is used herein to refer to some first dimension of a color space—e.g. one of a red dimension, a green dimension and a blue dimension of a red-green-blue (RGB) color space—as distinguished from N, which is used herein to refer to some second dimension of that same color space. Furthermore, X is used herein to refer to some first type of encoding, as distinguished from Z, which is used herein to refer to some second type of encoding. Accordingly, the term "MX data," for example, refers to data which is relates to some dimension M of a color space, where that data also has encoding of some X encoding type. Similarly, the term "NZ data," refers to data which is relates to some dimension N of a color space, where that data also has encoding of some Z encoding type.

Operations at 320 may, in an embodiment, determine MX data for a first video frame and NZ data for that same first video frame—e.g. where the MX data and NZ data include respective data each for some portion of the same color component value. In an embodiment, the MX data determined at 320 may, at 330, be sent via a first channel to some display conditioning logic. In an embodiment, such display conditioning logic receives the MX data independent of some random access buffer. By way of illustration and not limitation, the display conditioning logic may receive the MX data via a data path which does not include any random access buffer. For example, the MX data may be sent via the first channel to a first-in-first-out (FIFO) buffer, and subsequently debuffered from the FIFO buffer for sending to the display conditioning logic. Alternatively, the MX data may be sent to the display conditioning logic via a data path which does not include any buffer at all.

During the sending of such MX data, method 300 may, at 340, send the NZ data determined at 320 to the random access buffer via a second channel. In an embodiment, the NZ data may subsequently be debuffered from the random access buffer, wherein the debuffered NZ data is sent to the display conditioning logic.

Figure 4:
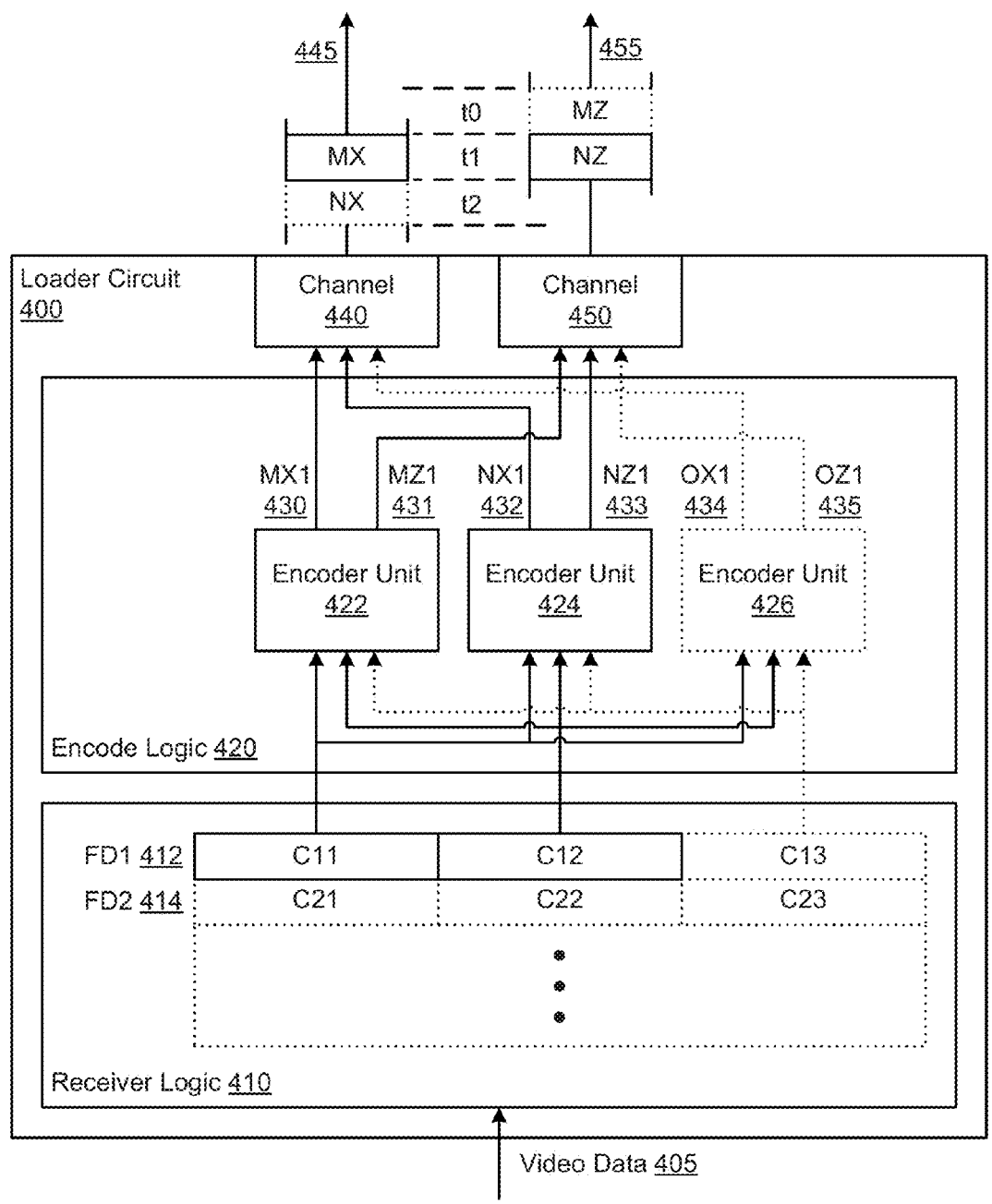
FIG. 4 is a block diagram illustrating elements of a loader circuit according to an embodiment.

FIG. 4 illustrates elements of a loader circuit 400 for providing video data according to an embodiment. Loader circuit 400 may include some or all of the features of video exchange logic 120, for example. In an embodiment, loader circuit provides some or all of the functionality of encode/decode layer 210.

Loader circuit 400 may include receiver logic 410 to receive video data 405. Based on video data 405, receiver logic 410 may determine respective data for one or more video frames. For example, receiver logic 410 may determine frame data FD1 412 for a video frame, where frame data FD1 412 includes color component data C11, C12, which, in an illustrative embodiment, each correspond to a different respective dimension of a color space. Frame data FD1 412 may also include other color component information such as C13, although certain embodiments are not limited in this regard. Features of various embodiments are discussed in terms of loader circuit 400 determining and processing frame data FD1 412. However, such discussion may be extended to apply to any of a variety of additional or alternative frame data—e.g. frame data FD2 for another video frame, where frame data FD2 includes color component data C21, C22, C23.

Determining frame data FD1 412 may include receiver logic 410 identifying a portion of video data 405—or a portion of data otherwise based on video data 405—as representing one or more color components in a particular dimension of a color space (e.g. a YUV color space). By way of illustration and not limitation, color component data C11 may be identified as representing some or all Y-dimension information for some region (one or more pixels, rows, columns and/or the like) of a video frame, and color component data C12 may be identified as representing some or all U-dimension (or alternatively, V-dimension) information for the same region of that video frame. In an embodiment, determining frame data FD1 412 may include receiver logic 410 rearranging one or more portions of video data 405—e.g. based on various color component characteristics thereof—to provide respective grouping of color component data C11 and C12. Additionally or alternatively, receiver logic 410 may variously allocate some of all such color component data, based on respective color component characteristics, each for respective encoding operations.

In an embodiment, loader circuit 400 includes encode logic 420 comprising one or more encoder units to operate on data determined by receiver logic 410. To illustrate features of various embodiments, encoding of data of frame data FD1 412 is discussed in terms of encoder units 422, 424 of encode logic 420. However, such discussion may be extended to further apply in different embodiments to one or more additional or alternative encoder units—e.g. including encoder unit 426.

In an embodiment, encode logic 420 includes multiple encoder units which each correspond to a different respective dimension of a color space (e.g. an RGB color space). Each such encoder unit may generate encoded data representing one or more color components in the corresponding color space dimension. By way of illustration and not limitation, encoder unit 422 may generate M-dimension information and encoder unit 424 may generate N-dimension information of a color space comprising dimensions M and N. In certain embodiments, encode logic 420 further includes encoder unit 426, which generates O-dimension information, where the color space further comprises another dimension O.

Encoder units 422, 424 may each provide multiple types of encoding for one or more respective color component values. For example, encoder unit 422 may generate encoded data MX1 430 and MZ1 431 each to variously represent for a video frame one or more color components in a dimension M of a color space. In an embodiment, encoded data MX1 430 includes an X-encoded representation of at least part of a color component value (for a component in dimension M), where encoded data MZ1 431 includes a Z-encoded representation of at least part of that same color component value. Alternatively or in addition, encoder unit 424 may generate encoded data NX1 432 and NZ1 433 each to variously represent for the same video frame one or more color components in a N dimension of the same color space. In an embodiment, encoded data NX1 432 includes an X-encoded representation of at least part of a color component value (for a component in dimension N), where encoded data NZ1 433 includes a Z-encoded representation of at least part of that same color component value. A color component value represented by encoded data MX1 430 and MZ1 431 and a color component value represented by encoded data NX1 432 and NZ1 433 may, for example, be different components of the same color for a pixel of the video frame. In an embodiment, encoder unit 426 generate encoded data OX1 434 and OZ2 435 each to variously represent for the video frame one or more color components in an O dimension of the color space.

Based on encoding performed by encode logic 420, loader circuit 400 may send X-encoded output 445 via channel 440 and Z-encoded output 455 via channel 450, where channels 440, 450 are each included in, or otherwise accessible to, loader circuit 400. For example, X-encoded output 445 may comprise a MX portion including some or all of encoded data MX1 430, and Z-encoded output 455 may comprise a NZ portion including some or all of encoded data NZ1 433. In an embodiment, the respective MX and NZ portions of X-encoded output 445 and Z-encoded output 455 are sent concurrently—e.g. in some common time slot t1.

X-encoded output 445 may further comprise an NX portion including some or all of encoded data NX1 432—e.g. where the NX portion is sent in some time slot t2 after time slot t1. Additionally or alternatively, Z-encoded output 455 further comprises a MZ portion including some or all of encoded data MZ1 431—e.g. where the MZ portion is sent in some time slot t0 before time slot t1. In an embodiment, the MZ and NZ portions of Z-encoded output 455 may be sent to different respective buffers via channel 450 in preparation for later processing by display conditioning logic (not shown). In an alternate embodiment, the MZ and NZ portions of Z-encoded output 455 may be sent to such respective buffers via different data paths—e.g. where the MZ portion is buffered via a data path (not shown) which is independent of channel 450. In certain embodiments, X-encoded output 445 further comprises another portion (not shown) including some or all of encoded data OX1 434, and/or Z-encoded output 455 further comprises another portion (not shown) including some or all of encoded data OZ1 435.

Figure 5:
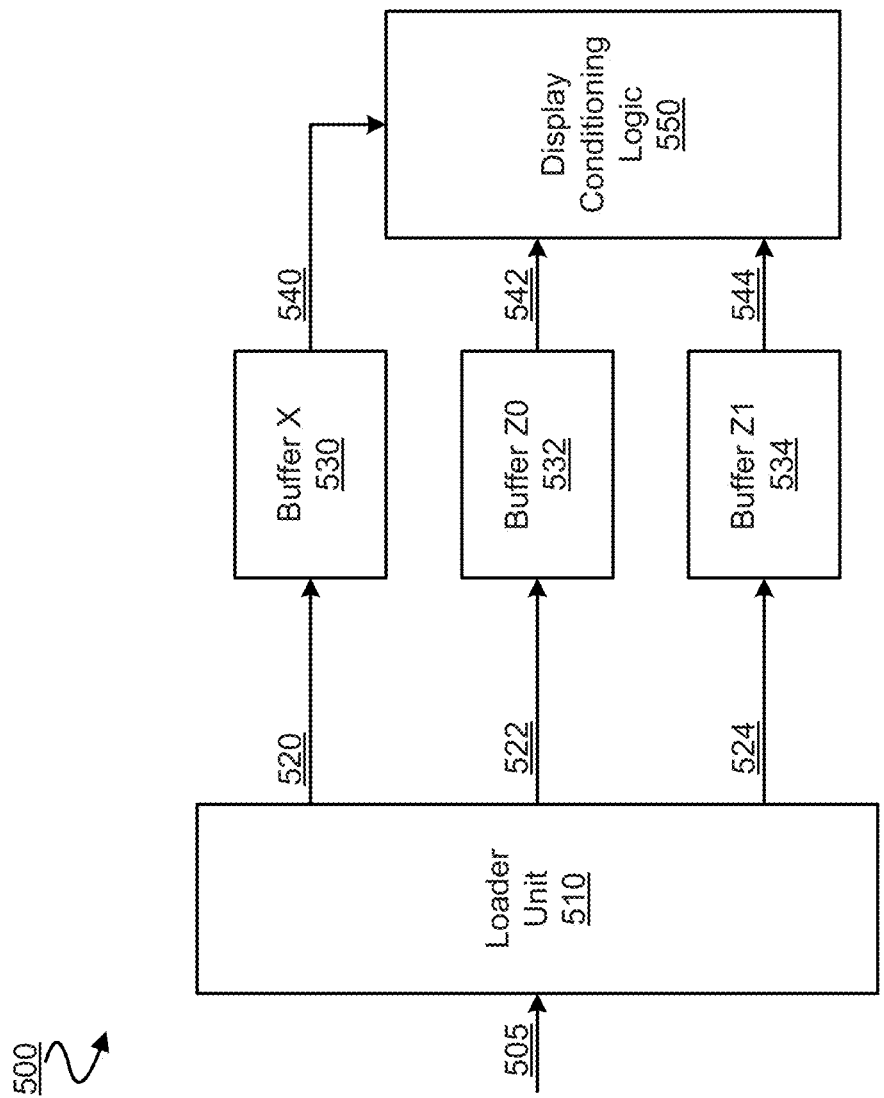
FIG. 5 is a block diagram illustrating elements of video exchange logic according to an embodiment.

FIG. 5 illustrates elements of video exchange logic 500 for providing video data according to an embodiment. Video exchange logic 500 may include some or all of the features of video exchange logic 120, for example. In an embodiment, video exchange logic 500 provides some or all of the functionality of functional stack 200.

Video exchange logic 500 may include a loader unit 510 to receive video data 505 and determine, based on video data 505, various data for a video frame. Loader unit 510 may include some or all of the functionality of loader circuit 400, for example. Video exchange logic 500 may further include display conditioning logic 550, where loader unit 510 is coupled to display conditioning logic 550 via one or more buffers. Based on the determining of data based on video data 505, loader unit 510 may output X-encoded data and Z-encoded data, some or all of which is to be variously buffered in preparation for later processing by display conditioning logic 550.

By way of illustration and not limitation, video exchange logic 500 may include buffers Z0 532, Z1 534, where loader unit 510 is coupled via channels 522, 524 to buffers Z0 532, Z1 534, respectively. In turn, buffers Z0 532, Z1 534 may be coupled to display conditioning logic 550—e.g. via channels 542, 544, respectively. In an embodiment, channel 522 provides Z-encoded output having some or all of the features of Z-encoded output 455. Such Z-encoded output may be provided to display conditioning logic 550 via buffer Z0 532—e.g. where buffer Z0 532 is a random access buffer. Channel 524 may provide other Z-encoded to display conditioning logic 550 via buffer Z1 534—e.g. where buffer Z1 534 is also a random access buffer. For example, loader unit 510 may alternate between channels 522, 524 in outputting a sequence of Z-encoded data.

In an embodiment, channel 520 provides X-encoded output having some or all of the features of X-encoded output 445. Although certain embodiments are not limited in this regard, video exchange logic 500 may further include buffer X 530 coupled to loader unit 510 via channel 520—e.g. where buffer X 530 is a first-in-first-out (FIFO) buffer further coupled to display conditioning logic 550 via channel 540. In an alternate embodiment, channel 520 provides X-encoded output directly to display conditioning logic 550 independent of any buffering after loader unit 510. For example, loader unit 510 may alternatively include a single storage bit for outputting X-encoded data to a channel directly coupled to display conditioning logic 550.

Display conditioning logic 550 may generate one or more signals for use in displaying a component color for a pixel of a video frame, wherein the component color is represented at least in part by X-encoded data received via channel 540 and at least in part by Z-encoded data received via one of channels 542, 544. In an embodiment, display conditioning logic 550 accesses such X-encoded data and Z-encoded data at the same time via various ones of channels 540, 542, 544. To facilitate such access, loader unit 510 may output Z-encoded data for a component color prior to outputting corresponding X-encoded data for that same component color.

Figure 6:
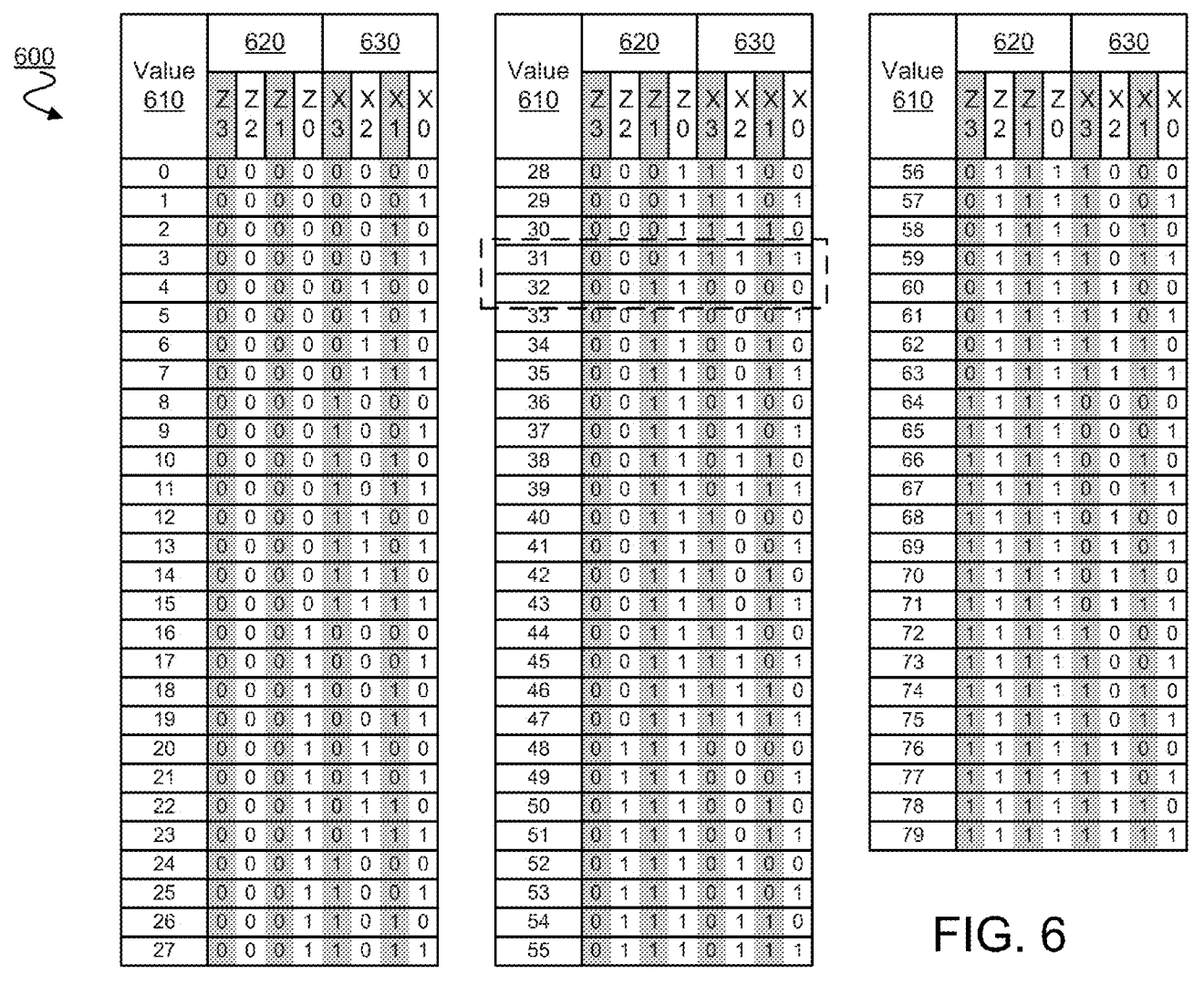

FIG. 6 shows a table 600 illustrating two types of encoding for video data provided according to an embodiment. Encoded data such as that output via channels 445, 455 may variously include one or more encoding characteristics of data in table 600.

To illustrate features of certain embodiments, an example of two different types of encoding—for brevity, referred to as X encoding and Z encoding—are shown in table 600 with respect a range of eighty (80) color component values 610—i.e. values 0-79. However table 600 may be extended to provide for encoding of additional color component values, consistent with techniques discussed herein.

For each color component value in the range of values 610, table 600 shows a corresponding Z-encoded portion 620 for that color component value including and a corresponding X-encoded portion 630 for that color component value. Parts of Z-encoded portion 620 and X-encoded portion, 630 may include, respectively, four bits [Z3:Z0] and four bits [X3:X0]—e.g. where bits of Z-encoded portion 620 are comparatively more significant than bits of X-encoded portion 630. Table 600 may be extended for either or both of Z-encoded portions, X-encoded portion 620, 630 to variously include additional or fewer bits, according to different embodiments.

As shown in table 600, X-encoded portion 630 increases in a traditional binary fashion with each incremental increase of color component value in the range of values 610. For example, a transition from value "7" to value "8" in the range of values 610 corresponds to a transition of bits [X3:X0] in portion 630 from "0111" to "1000."

By contrast, the change in Z-encoded portion 620 with each incremental increase in the range of values 610 corresponds to an incremental shifting of "1" bits into a set of "0" bits for each of bits [Z3:Z0]. More particularly, each incremental increase in [Z3:Z0] sets to "1" the least significant of those bits in [Z3:Z0] which are set to "0". For example, a transition from value "31" to value "32" in the range of values 610 corresponds to a transition of bits [Z3:Z0] in portion 630 from "0001" to "0011." This is to be distinguished, for example, from the alternative of some binary transition of bits [Z3:Z0] in portion 630 from "0001" to "0010." Such encoding is one form of what is referred to as "thermometer" encoding, due to the thermometer-like increase of sequential "1" bits in incrementally larger values of [Z3:Z0]. Any of a variety of alternative types of encoding may be represented with Z-encoded portion 620, according to different embodiments.

Loader circuit 400 or similar hardware may output data—such as data shown in table 600—to represent a component of a pixel color, where such data includes a first portion having a first type of encoding and a second portion having a second type of encoding. In an illustrative scenario, color component data C11 of frame data FD1 412 may include a value for a Y-component for a pixel's color, where color component C12 of frame data FD1 412 includes a value for a U-component of that same pixel's color, and where color component data C13 of frame data FD1 412 includes a value for a V-component of that same pixel's color. In such an embodiment, encoder units 422, 424, 426 may correspond, respectively, to a R-dimension, a G-dimension and a B-dimension of a RGB color space.

A triplet of (Y, U, V) values for a given pixel's color—e.g. a triplet based on color component data C11, C12 and C13—may be converted by encode logic 420 to generate a corresponding triplet of (R, G, B) values for that pixel color. For example, such R, G, B values may be generated according to the following:

$$R = Y + [1.402][V-128] \quad (1)$$

$$G = Y - [0.34414][U-128] - [0.71414][V-128] \quad (2)$$

$$B = Y + [1.772][U-128] \quad (3)$$

The above equations (1)-(3) are merely illustrative, and are not limiting on certain embodiments. Any of a variety of other YUV-RGB transforms known in the art may be a basis for generating a (R, G, B) triplet, according to different embodiments.

In an illustrative scenario for one embodiment, processing of color component data C11, C12 and C13 by encoder unit 422 results in MX1 430 including an X-encoded portion of an R value of a (R, G, B) triplet, and in encoded data MZ1 431 including a Z-encoded portion of that same R value. Additionally of alternatively, processing of color component data C11, C12 and C13 by encoder unit 424 may result in encoded data NX1 432 including an X-encoded portion of a G value of that same (R, G, B) triplet, and encoded data NZ1 433 including Z-encoded portion of that same G value. Additionally of alternatively, processing of color component data C11, C12 and C13 by encoder unit 426 may result in encoded data OX1 432 including an X-encoded portion of a B value of that same (R, G, B) triplet, and encoded data OZ1 433 including Z-encoded portion of that same B value.

The differences in encoding for Z-encoded portion and X-encoded portion 620, 630 result in [Z3:Z0] taking on any of only five possible values ("0000," "0001," "0011," "0111" and "1111"), whereas [X3:X0] can take on any of sixteen different values (0x0 to 0xF). Correspondingly, circuitry to implement Z-encoding of a portion of a color component value may be simpler and/or quicker than circuitry to implement X-encoding of a portion of that same color component value.

By way of illustration and not limitation, the five possible value of [Z3:Z0] may each be associated by encoder unit 422 with one or more respective range sets—e.g. wherein each such range set includes one or more ranges of values. The one or more value ranges in a given range set may correspond to a respective dimension of a color space. For example, a particular range set may include, or otherwise be associated with, a range of Y-dimension values, a range of U-dimension values and/or a range of V-dimension values. Dimensions in any of a variety of other color spaces may alternatively be associated with a range set, according to different embodiments. Encoder unit 422 may include logic to quickly evaluate one or more values in a received (Y, U, V) triplet to determine whether the one or more values are each within a corresponding value range in particular range set.

Based on such evaluation, encoder unit 422 may associate the (Y, U, V) triplet with a particular range set—e.g. where each value range in a range set is identified as including a corresponding value in the (Y, U, V) triplet. In response to such associating, encoder unit 422 may set its [Z3:Z0] output to the value corresponding to the particular range set, thereby providing Z-encoding of a portion of a R value corresponding to the received (Y, U, V) triplet. Additionally or alternatively, encoder unit 424 may associate the five possible value of [Z3:Z0] each with one or more other respective range sets, associate the received (Y, U, V) triplet with one of such range sets and, in response to such associating, and generate a [Z3:Z0] output to provide Z-encoding of a portion of a G value corresponding to the received (Y, U, V) triplet. Additionally or alternatively, encoder unit 426 may associate the five possible value of [Z3:Z0] each with one or more other respective range sets, associate the received (Y, U, V) triplet with one of such range sets and, in response to such associating, and generate a [Z3:Z0] output to provide Z-encoding of a portion of a B value corresponding to the received (Y, U, V) triplet.

By utilizing such range sets to variously determine [Z3:Z0] values, encoder units 422, 424, 426 may perform Z-encoding for various portions of color constituents faster than X-encoding of other portions of the same color constituents. Accordingly, Z-encoding data for some region (one or more pixels, rows, columns and/or the like) of a video frame may be provided before X-encoding data that same region of the video frame.

Figure 7:
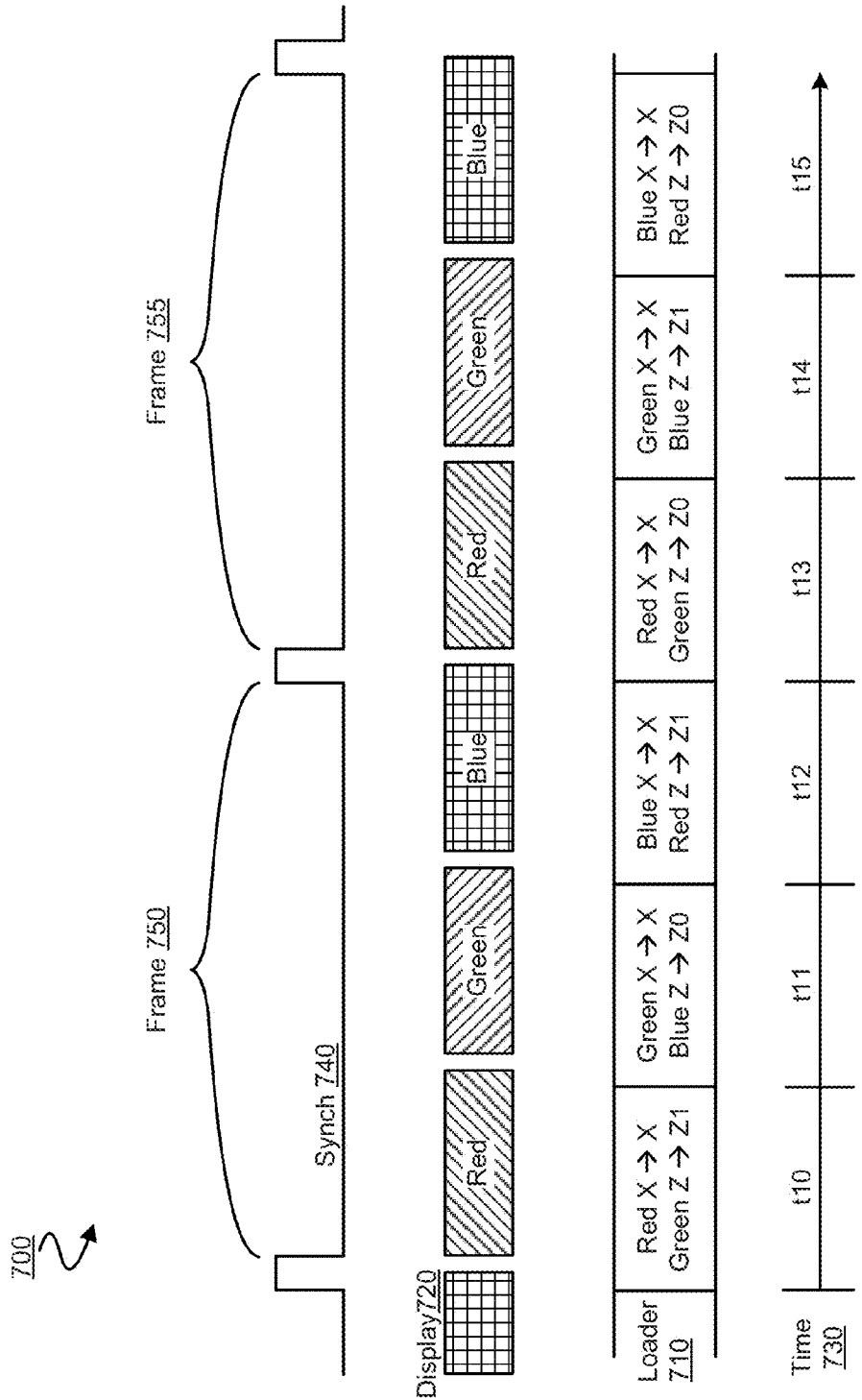
FIG. 7 is a timing diagram illustrating elements of a video data exchange according to an embodiment.

FIG. 7 illustrates a timing diagram 700 for an exchange of video data according to an embodiment. Timing diagram 700 includes data exchanges performed over a period of time 730 including time slots t10 through t15—e.g. exchanges such as those performed in a system having some or all of the features of computer system 100. For example, exchanges in timeline 700 may be performed by logic, e.g. video exchange logic 500, having some or all of the features of video exchange logic 120.

Timing diagram 700 includes data exchanges by loader 710, in which encoded data is variously output to one or more respective buffers. Loader 710 may include some or all of the features of loader unit 510—e.g. where loader 710 variously sends data to respective ones of buffers X, Z0 and Z1 (corresponding to buffer X 530, buffer Z0 532 and buffer Z1 534, respectively).

Operation of loader 710 to output encoded video data may be synchronized with one or more video display and/or video data exchange events. For example, loader 710 may be coupled to received one or more signals—e.g. from buffer hardware, display conditioning logic, control circuitry of a display device and/or the like—indicating a point of synchronization for outputting encoded video data. In an illustrative embodiment, loader 710 detects a synchronization signal (or Synch) 740 indicating a timing of operations by a display 720 which is to operate based on video output from loader 710. Display 720 may include a LCOS projector or other hardware which, for example, displays a given video frame by sequentially strobing red components, green components and blue components (e.g. a red field, green field and blue field) of that video frame. Synch 740 may indicate a synchronization point such as a transition between operations for displaying components of one video frame to operations for displaying components of a next video frame. Loader 710 may be preconfigured to output video data in a manner which supports display 720 displaying red, green and blue components in a particular order. However, the particular order is not limiting on certain embodiments.

Based on Synch 740, loader 710 may coordinate operations with video display and/or video data exchange events or other hardware—e.g. including outputting particular types of data in different respective time slots including t10-t15. The length of such time slots may be based, for example, on a frequency of a synchronization signal, a clock speed, a total number of fields in a video frame to be displayed, and/or the like.

In an embodiment, time slots t10, t13 correspond to periods during which display 720 displays red component video information for frames 750, 755, respectively. For example, loader 710 may variously output X-encoded red component video data during both t10 and t13, where such data is a basis for corresponding Red display periods of display 720. Alternatively or in addition, time slots t11, t14 may correspond to periods during which display 720 displays green component video information for frames 750 and 755, respectively. For example, loader 710 may variously output X-encoded green component video data during both t11 and t14, where such data is a basis for corresponding Green display periods of display 720. Alternatively or in addition, time slots t12, t15 may correspond to periods during which display 720 displays blue component video information for frames 750 and 755, respectively. For example, loader 710 may variously output X-encoded blue component video data during both t12 and t15, where such data is a basis for corresponding Blue display periods of display 720. Depending on implementation specific constraints of various embodiments, there may be some time offset between the beginning of a particular time slot of loader 710 and the beginning of the corresponding display period of display 720.

Although not shown in timing diagram 700, loader 710 may buffer Z-encoded red component data for frame 750 prior to time slot t10—e.g. where such Z-encoded data is buffered to buffer Z0. In such an embodiment, this Z-encoded red component data is already available in buffer Z0 for access by display conditioning logic when, during t10, loader 710 begins to output corresponding X-encoded red component data for frame 750 to buffer X. Consequently, certain embodiments provide for comparatively short (if any) time-in-buffer for X-encoded data, and for earlier processing of such X-encoded data with its corresponding, already available, Z-encoded data—e.g. to begin the Red display period for frame 750.

In an embodiment, loader 710 buffers Z-encoded green component data for frame 750 during slot t10—e.g. to buffer Z1. This Z-encoded green component data is therefore already available in buffer Z1 for access by display conditioning logic when, during t11, loader 710 begins to output corresponding X-encoded green component data for frame 750 to buffer X. Such Z-encoded green component data may be made available prior to its corresponding X-encoded green component data because logic of loader 710 to determine Z-encoding for a portion of a color component value is relatively simpler and/or faster, as compared to logic to determine X-encoding for a portion of that same color component value. As with the red component data for frame 750 discuss above, certain embodiments provide earlier processing of X-encoded green component data with its corresponding, already available, Z-encoded data—e.g. for display 720 to more quickly begin the Green display period for frame 750.

In an embodiment, loader 710 buffers Z-encoded blue component data for frame 750 during slot t11—e.g. to buffer Z0. This Z-encoded blue component data is therefore already available in buffer Z0 for access by display conditioning logic when, during t12, loader 710 begins to output corresponding X-encoded blue component data for frame 750 to buffer X. As with the red and green component data discuss above, certain embodiments provide earlier processing of X-encoded blue component data with its corresponding, already available, Z-encoded data—e.g. for display 720 to more quickly begin the Blue display period for frame 750.

In an alternate embodiment, mechanisms of loader 710 to quickly generate output video information may operate at a high enough speed and/or with enough processing capacity to buffer all video information for a given frame—e.g. frame 750—in a length of time which is not greater than half the total duration of one cycle of Synch 740. In such an embodiment, such buffered video information may be available in time for display 720 to display that video frame twice in the corresponding one cycle of Synch 740. For example, loader 710 may facilitate display 720 being able to successively display a red component, a green component and a blue component of the video frame in the one cycle of Synch 740, and playback that successively displaying a second time within that same one cycle of Synch 740.

Loader 710 may output video data for a next video frame 755 in a manner similar to that for video frame 750. For example, during t13, loader 710 may output X-encoded red component data for frame 755 to buffer X, and output Z-encoded green component data for frame 755 to buffer Z0. The Red display period of display 720 for frame 755 may begin relatively early (e.g. as compared to a similar display period for a conventional video display) since the Z-encoded red component data for frame 755 was previously buffered during t12. Furthermore, during t14, loader 710 may output X-encoded green component data for frame 755 to buffer X, and output Z-encoded blue component data for frame 755 to buffer Z1. The Green display period of display 720 for frame 755 may begin relatively early since the Z-encoded green component data for frame 755 was previously buffered during t13. Further still, during t15, loader 710 may output X-encoded blue component data for frame 755 to buffer X, and output Z-encoded red component data for some next frame (not shown) to buffer Z0. The Blue display period of display 720 for frame 755 may begin relatively early since the Z-encoded blue component data for frame 755 was previously buffered during t14.

Figure 8:
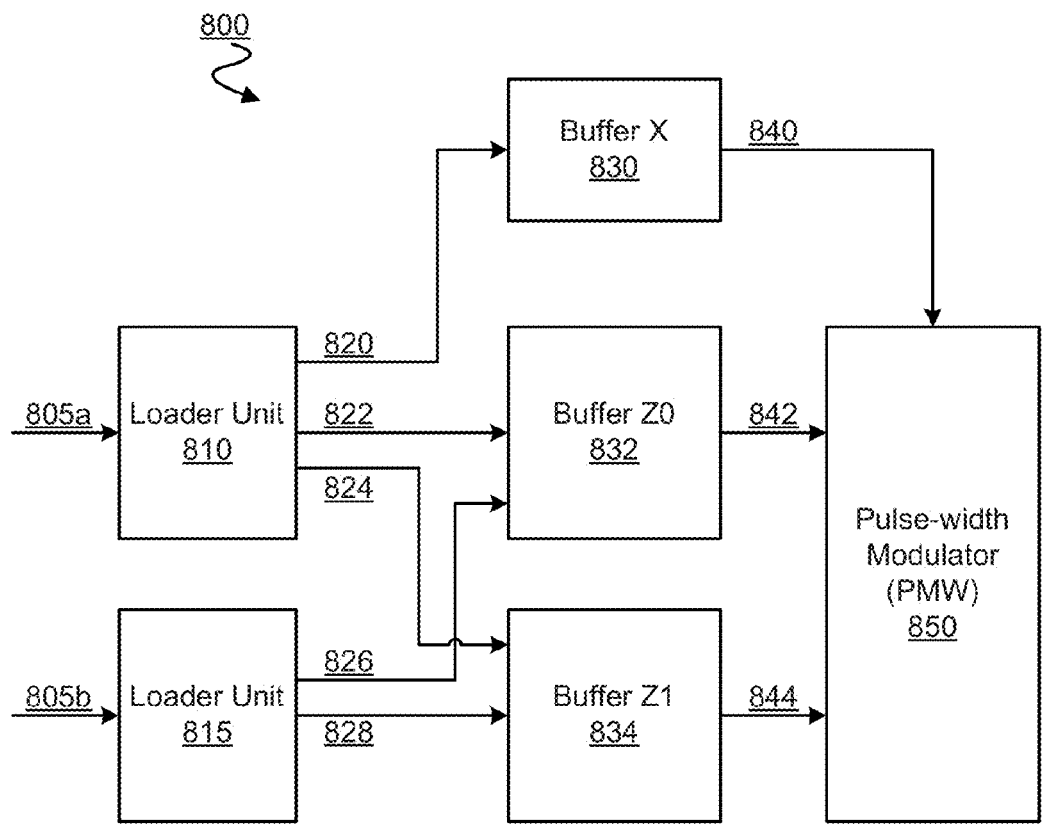
FIG. 8 is a block diagram illustrating elements of a video exchange logic according to an embodiment.

FIG. 8 illustrates elements of video exchange logic 800 for providing video data according to an embodiment. Video exchange logic 800 may include some or all of the features of video exchange logic 120, for example. In an embodiment, video exchange logic 800 provides some or all of the functionality of functional stack 200.

Video exchange logic 800 may include a loader unit 810 to receive video data 805a and determine, based on video data 805a, various data for a video frame. Loader unit 810 may include some or all of the functionality of loader unit 510, for example. Video exchange logic 800 may further include a similar loader unit 815 to receive video data 805b and determine, based on video data 805b, various data for the same video frame. In an embodiment, video data 805a and video data 805b are both data describing the same sequence of video frames. For example, video data 805a, 805b may be the same data, where one or both of loader units 810, 815 variously discard or otherwise ignore respective portions thereof. Alternatively, video data 805a, 805b may be different portions of a video data stream, in certain embodiments.

Video exchange logic 800 may further include a pulse width modulator (PWM) 850 and/or other display conditioning logic, where loader unit 810 is coupled to PWM 850 via one or more buffers. PWM 850 is merely illustrative of one type of display conditioning logic to receive video data from loader unit 810, and is not limiting on certain embodiments. In response to the determining of data based on video data 805a, loader unit 810 may output X-encoded data and Z-encoded data, some or all of which is to be variously buffered in preparation for later processing by PWM 850. Moreover, in response to the determining of data based on video data 805b, loader unit 815 may also output Z-encoded data for various buffering in preparation for later processing by PWM 850.

By way of illustration and not limitation, video exchange logic 800 may further include buffers Z0 832, Z1 834, where loader unit 810 is coupled via channels 822, 824 to buffers Z0 832, Z1 834, respectively. In turn, buffers Z0 832, Z1 834 may be coupled to PWM 850—e.g. via channels 842, 844, respectively. Moreover, loader unit 815 may be coupled via channels 826, 828 to buffers Z0 832, Z1 834, respectively. In an embodiment, channel 822 provides Z-encoded output having some or all of the features of Z-encoded output 455. Such Z-encoded output may be provided to PWM 850 via buffer Z0 832—e.g. where Z0 832 is a random access buffer. Channel 824 may provide similar Z-encoded data to PWM 850 via buffer Z1 834—e.g. where Z1 834 is also a random access buffer. For example, loader unit 810 may alternate between channels 822, 824 in outputting Z-encoded data. In an embodiment, loader unit 815 provides similar Z-encoded output via channel 826 to buffer Z0 832, and provides other such Z-encoded output via channel 828 to buffer Z1 834. For example, loader unit 810 may alternate between channels 826, 828 in outputting Z-encoded data.

In an embodiment, video exchange logic 800 further includes buffer X 830 coupled to receive X-encoded output from loader unit 810 via channel 820—e.g. where such X-encoded output includes some or all of the features of X-encoded output 445. Buffer X 830 may be further coupled to PWM 850—e.g. via channel 840. Buffer X 830 may include a first-in-first-out (FIFO) buffer, although certain embodiments are not limited in this regard. In an alternate embodiment, channel 820 provides X-encoded output directly to PWM 850 independent of buffering by any buffer X 830. For example, loader unit 810 may include a single storage bit—e.g. in lieu video exchange logic 800 having buffer X 830—to store successive bits of X-encoded data to be output directly to PWM 850.

PWM 850 may generate one or more signals for displaying a component color for a pixel of a video frame, wherein the component color is represented at least in part by X-encoded data received via channel 840 and at least in part by Z-encoded data received via one of channels 842, 844. In an embodiment, PWM 850 accesses such X-encoded data and Z-encoded data at the same time via various ones of channels 840, 842, 844. To facilitate such access by PWM 850, loader unit 810 may output Z-encoded data for a component color prior to outputting corresponding X-encoded data for that same component color.

Figure 9:
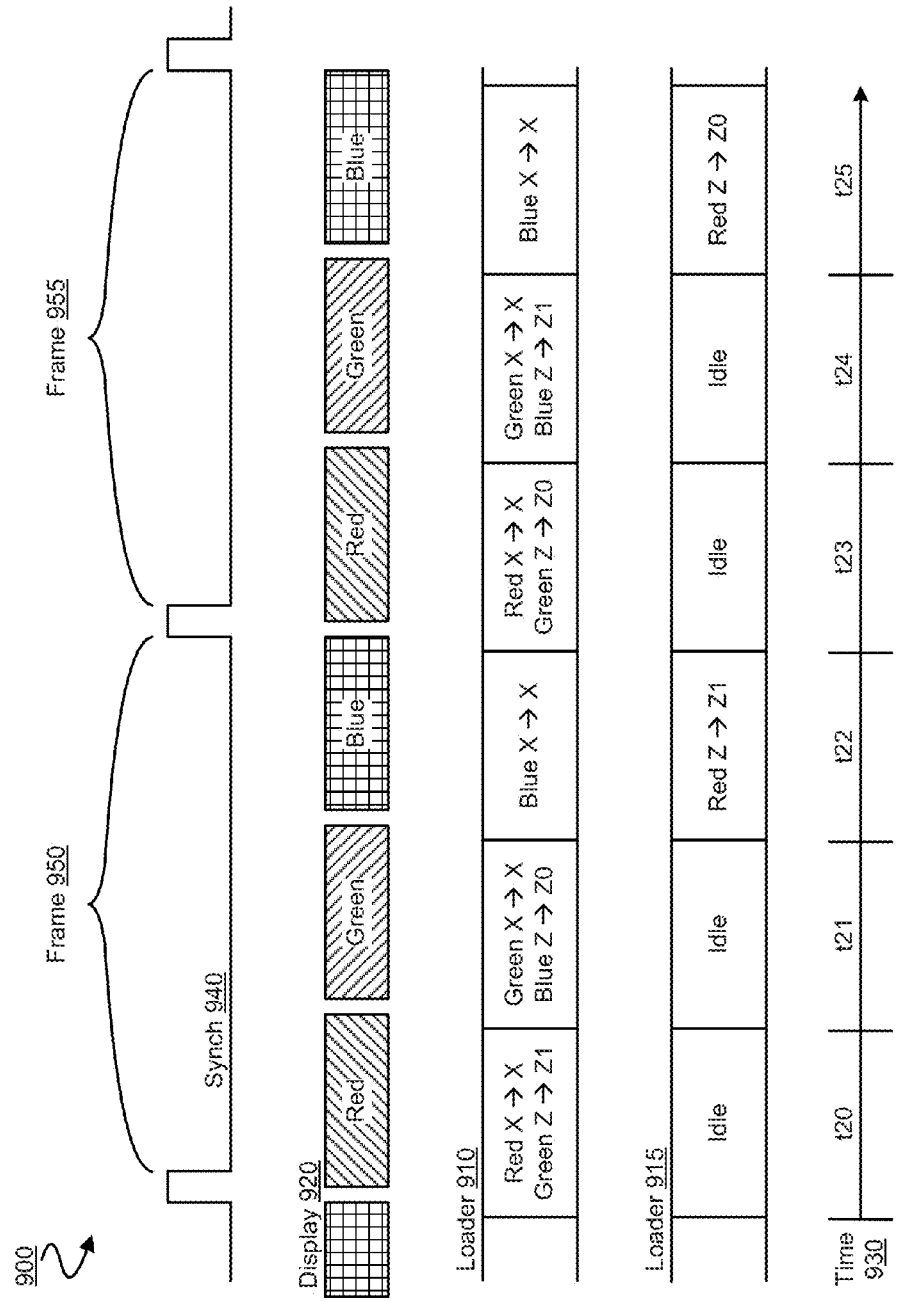
FIG. 9 is a timing diagram illustrating elements of a video data exchange according to an embodiment.

FIG. 9 illustrates a timing diagram 900 for an exchange of video data according to an embodiment. Timing diagram 900 includes data exchanges performed over a period of time 930 including time slots t20 through t25—e.g. exchanges such as those performed in a system having some or all of the features of computer system 100. For example, exchanges in timeline 900 may be performed by video exchange logic 800.

Timing diagram 900 includes respective data exchanges by loader 910 and loader 915, in which encoded data is variously output to one or more respective buffers. Loaders 910, 915 may include some or all of the features of loader units 810, 815, respectively. For example, loader 910 may variously sends data to respective ones of buffers X, Z0 and Z1 (corresponding to buffer X 830, buffer Z0 832 and buffer Z1 834, respectively). Additionally or alternatively, loader 915 may variously send data to respective ones of buffers Z0 and Z1.

Respective operations of loaders 910, 915 to output encoded video data may be synchronized with one or more video display and/or video data exchange events. For example, either or both of loaders 910, 915 may be coupled to detect a signal Synch 940—e.g. including some or all of the features of Synch 740—which indicates a synchronization point such as a transition of a display 920 between operations for displaying components of a video frame 950 to operations for displaying components of a next video frame 955. Display 920 may include some or all of the features of display 720, for example.

In an embodiment, time slots t20, t23 of time period 930 correspond to periods during which display 920 displays red component video information for frames N and N+1, respectively. For example, loader 910 may variously output X-encoded red component video data during both t20 and t23, where such data is a basis for corresponding Red display periods of display 920. Alternatively or in addition, time slots t21, t24 may correspond to periods during which display 920 displays green component video information for frames N and N+1, respectively. For example, loader 910 may variously output X-encoded green component video data during both t21 and t24, where such data is a basis for corresponding Green display periods of display 920. Alternatively or in addition, time slots t22, t25 may correspond to periods during which display 920 displays blue component video information for frames N and N+1, respectively. For example, loader 910 may variously output X-encoded blue component video data during both t22 and t25, where such data is a basis for corresponding Blue display periods of display 920. Depending on implementation specific constraints of various embodiments, there may be some time offset between the beginning of a particular time slot of loader 910 and the corresponding component display period of display 920.

Although not shown in timing diagram 900, loader 915 may buffer Z-encoded red component data for frame 950 prior to time slot t20—e.g. where such Z-encoded data is buffered to buffer Z0. In such an embodiment, this Z-encoded red component data is therefore already available in buffer Z0 for access by display conditioning logic when, during t20, loader 910 begins to output corresponding X-encoded red component data for frame 950 to buffer X. Consequently, certain embodiments provide for comparatively short (if any) time-in-buffer for X-encoded data, and for earlier processing of such X-encoded data with its corresponding, already available, Z-encoded data—e.g. to begin the Red display period for frame 950.

In an embodiment, loader 910 buffers Z-encoded green component data for frame 950 during slot t20—e.g. to buffer Z1. This Z-encoded green component data is therefore already available in buffer Z1 for access by display conditioning logic when, during t21, loader 910 begins to output corresponding X-encoded green component data for frame 950 to buffer X. Such Z-encoded green component data may be made available prior to its corresponding X-encoded green component data because logic of loader 910 to determine Z-encoding for a portion of a color component value is relatively simpler and/or faster, as compared to logic to determine X-encoding for a portion of that same color component value. As with the red component data for frame 950 discuss above, certain embodiments provide earlier processing of X-encoded green component data with its corresponding, already available, Z-encoded data—e.g. for display 920 to more quickly begin the Green display period for frame 950.

In an embodiment, loader 910 buffers Z-encoded blue component data for frame 950 during slot t21—e.g. to buffer Z0. This Z-encoded blue component data is therefore already available in buffer Z0 for access by display conditioning logic when, during t22, loader 910 begins to output corresponding X-encoded blue component data for frame 950 to buffer X. As with the red and green component data discuss above, certain embodiments provide earlier processing of X-encoded blue component data with its corresponding, already available, Z-encoded data—e.g. for display 920 to more quickly begin the Blue display period for frame 950. During t22, loader 915 may load into buffer Z1 Z-encoded red component data for frame 955. This Z-encoded red component data is therefore already available in buffer Z1 for access by display conditioning logic when, during t23, loader 910 begins to load corresponding X-encoded red component data for frame 955 into buffer X.

In an alternate embodiment, mechanisms of loaders 910, 915 to quickly generate output video information may operate at a high enough speed and/or with enough processing capacity to buffer all video information for a given frame—e.g. frame 950—in a length of time which is not greater than half the total duration of one cycle of Synch 940. In such an embodiment, such buffered video information may be available in time for display 920 to display that video frame twice in the corresponding one cycle of Synch 940. For example, loaders 910, 915 may facilitate display 920 being able to successively display a red component, a green component and a blue component of the video frame in the one cycle of Synch 940, and playback that successively displaying a second time within that same one cycle of Synch 940.

Loaders 910, 915 may output video data for video frame 955 in a manner similar to that for video frame 950. For example, during t23, loader 910 may output X-encoded red component data for frame 955 to buffer X, and output Z-encoded green component data for frame 955 to buffer Z0. The Red display period of display 920 for frame 955 may begin relatively early since the Z-encoded red component data for frame 955 was previously buffered during t22. Furthermore, during t24, loader 910 may output X-encoded green component data for frame 955 to buffer X, and output Z-encoded blue component data for frame 955 to buffer Z1. The Green display period of display 920 for frame 955 may begin relatively early since the Z-encoded green component data for frame 955 was previously buffered during t23. Further still, during t25, loader 910 may output X-encoded blue component data for frame 955 to buffer X, and loader 915 may output Z-encoded red component data for some next frame (not shown) to buffer Z0. The Blue display period of display 920 for frame 955 may begin relatively early since the Z-encoded blue component data for frame 955 was previously buffered during t24.

Techniques and architectures for providing video data are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method comprising:
   at a first loader circuit:
      receiving first video data;
      determining, based on the received first video data, first MX data for a first video frame, first MZ data for the first video frame and first NZ data for the first video frame, wherein M and N are different respective dimensions of a color space, and wherein X is a first encoding type and Z is a second encoding type;
      sending the first MX data from the first loader circuit via a first channel, wherein display conditioning logic receives the first MX data independent of a first random access buffer;
      during the sending the first MX data, sending the first NZ data from the first loader circuit via a second channel to the first random access buffer, wherein the first MX data and the first NZ data are sent in a first time slot; and
      sending the first MZ data from the first loader circuit to a second random access buffer via a channel other than the first channel, wherein the first MZ data is sent in a second time slot preceding the first time slot.

2. The method of claim 1, wherein the first MX data includes data representing a first portion of a color component value, and wherein the first NZ data includes data representing a second portion of the color component value.

3. The method of claim 1, wherein the second encoding type is a thermometer encoding type.

4. The method of claim 1, wherein the channel other than the first channel is the second channel.

5. The method of claim 4, wherein determining the first MZ data is based on a set of one or more value ranges which each correspond to a respective dimension of another color space.

6. The method of claim 4, further comprising:
   receiving the first MX data at a first-in-first-out (FIFO) buffer; and
   receiving the first MZ data at the second random access buffer;
   debuffering the first MX data from the FIFO buffer to the display conditioning logic; and
   during the debuffering the first MX data, debuffering the MZ from the second random access buffer to the display conditioning logic.

7. The method of claim 4, further comprising:
   determining based on the received first video data first NX data for the first video frame; and
   sending the first NX data from the first loader circuit via the first channel, wherein the first NX data is sent in a third time slot after the first time slot.

8. The method of claim 1, further comprising:
   at a second loader circuit:
      determining based on second video data first MZ data for the first video frame; and
      sending the first MZ data from the second loader circuit to a second random access buffer via a third channel, wherein the first MZ data is sent in a second time slot preceding the first time slot.

9. An apparatus comprising:
   a video exchange circuit to receive first video data, the video exchange circuit including:
      encode logic to determine, based on the first video data, first MX data for a first video frame, first MZ data for the first video frame and first NZ data for the first video frame, wherein M and N are different respective dimensions of a color space, and wherein X is a first encoding type and Z is a second encoding type, the encode logic further to send the first MX data from the video exchange circuit via a first channel concurrent with the encode logic to send the first NZ data from the video exchange circuit to a first random access buffer via a second channel,
   wherein the first MX data and the first NZ data are sent in a first time slot, the encode logic further to send the first MZ data from the video exchange circuit to a second random access buffer via a channel other than the first channel, wherein the first MZ data is sent in a second time slot preceding the first time slot, wherein display conditioning logic receives the first MX data independent of the first random access buffer.

10. The apparatus of claim 9, wherein the first MX data includes data to represent a first portion of a color component value, and wherein the first NZ data includes data to represent a second portion of the color component value.

11. The apparatus of claim 9, wherein the second encoding type is a thermometer encoding type.

12. The apparatus of claim 9, wherein the channel other than the first channel is the second channel.

13. The apparatus of claim 12, wherein the encode logic to determine the first MZ data based on a set of one or more value ranges which each correspond to a respective dimension of another color space.

14. The apparatus of claim 12, the encode logic further to determine, based on the received first video data, first NX data for the first video frame, the encode logic further to send the first NX data from the first loader circuit via the first channel, wherein the first NX data is sent in a third time slot after the first time slot.

15. The apparatus of claim 9, further comprising:
a second loader circuit to determine, based on second video data, first MZ data for the first video frame, the second loader circuit further to send the first MZ data from the second loader circuit to a second random access buffer via a third channel, wherein the first MZ data is sent in a second time slot preceding the first time slot.

16. A system comprising:
a first random access buffer;
a video exchange circuit to receive first video data, the video exchange circuit including:
encode logic to determine, based on the first video data, first MX data for a first video frame, first MZ data for the first video frame and first NZ data for the first video frame, wherein M and N are different respective dimensions of a color space, and wherein X is a first encoding type and Z is a second encoding type, the encode logic further to send the first MX data from the video exchange circuit via a first channel concurrent with the encode logic to send the first NZ data from the video exchange circuit to the first random access buffer via a second channel,
wherein the first MX data and the first NZ data are sent in a first time slot, the encode logic further to send the first MZ data from the video exchange circuit to a second random access buffer via a channel other than the first channel, wherein the first MZ data is sent in a second time slot preceding the first time slot, wherein display conditioning logic receives the first MX data independent of the first random access buffer.

17. The system of claim 16, wherein the first MX data includes data to represent a first portion of a color component value, and wherein the first NZ data includes data to represent a second portion of the color component value.

18. The system of claim 16, wherein the channel other than the first channel is the second channel.

19. The system of claim 18, wherein the encode logic to determine the first MZ data based on a set of one or more value ranges which each correspond to a respective dimension of another color space.

20. The system of claim 16, further comprising:
a second loader circuit to determine, based on second video data, first MZ data for the first video frame, the second loader circuit further to send the first MZ data from the second loader circuit to a second random access buffer via a third channel, wherein the first MZ data is sent in a second time slot preceding the first time slot.

* * * * *